United States Patent [19]

Thomas, Jr.

[11] Patent Number: 5,032,213
[45] Date of Patent: Jul. 16, 1991

[54] THERMAL LID SEALING METHOD AND APPARATUS

[75] Inventor: John S. Thomas, Jr., Williamsburg, Va.

[73] Assignee: Rampart Packaging Inc., Williamsburg, Va.

[21] Appl. No.: 438,377

[22] Filed: Nov. 20, 1989

Related U.S. Application Data

[60] Division of Ser. No. 306,133, Feb. 6, 1989, abandoned, which is a continuation-in-part of Ser. No. 136,624, Dec. 22, 1987, abandoned.

[51] Int. Cl.⁵ .............................................. B30B 15/34
[52] U.S. Cl. .................................... 156/498; 53/300;
53/341; 156/69; 156/537; 156/583.1
[58] Field of Search ............. 156/498, 69, 537, 583.1;
53/300, 341, 478, 485; 100/273, 259

[56] References Cited

U.S. PATENT DOCUMENTS

| | | | |
|---|---|---|---|
| 2,298,393 | 10/1942 | Lindner | 100/259 |
| 2,546,208 | 3/1951 | Barton | 264/248 |
| 2,679,469 | 5/1954 | Bedford | 156/198 |
| 3,052,926 | 9/1962 | Quinche et al. | 264/248 |
| 3,137,111 | 4/1962 | Bostrom | 53/373 |
| 3,152,944 | 10/1964 | Mojonnier et al. | 156/498 |
| 3,196,068 | 7/1965 | Schoder et al. | 156/537 |
| 3,342,817 | 9/1967 | Young | 264/248 |
| 3,449,183 | 6/1969 | Zelnick | 156/69 |
| 3,509,682 | 4/1968 | Logemann | 53/39 |
| 3,660,965 | 5/1972 | Morera | 53/329 |
| 3,880,695 | 4/1975 | Standley et al. | 156/498 |
| 3,969,455 | 7/1976 | Moller | 264/89 |
| 4,048,781 | 9/1977 | Johansen | 264/322 |
| 4,217,156 | 8/1980 | Slungaard et al. | 156/69 |
| 4,282,699 | 8/1981 | Embro, Jr. | 53/298 |
| 4,555,293 | 11/1985 | French | 156/308.4 |
| 4,662,978 | 5/1987 | Oki | 156/498 |

FOREIGN PATENT DOCUMENTS

| | | |
|---|---|---|
| 2041808 | 2/1972 | Fed. Rep. of Germany . |
| 60-4031 | 1/1985 | Japan . |
| 1020542 | 2/1966 | United Kingdom . |
| 1190381 | 5/1970 | United Kingdom . |
| 1241425 | 8/1971 | United Kingdom . |

*Primary Examiner*—Michael Wityshyn
*Attorney, Agent, or Firm*—Donald F. Haas

[57] ABSTRACT

A method and apparatus are disclosed for heat sealing two thermoplastic parts by clamping the parts together with a cooled clamp so that the edges of the parts are exposed and melting the edges together by contacting them with a hot seal head wherein a layer of a protective material is interposed between the hot seal head and the parts to be sealed.

3 Claims, 3 Drawing Sheets

THERMAL LID SEALING METHOD AND APPARATUS

REFERENCE TO PRIOR APPLICATION

This application is a division of Ser. No. 306,133 which was filed Feb. 6, 1989, which is a continuation-in-part of application Ser. No. 136,624 which was filed on Dec. 22, 1987, now abandoned.

BACKGROUND OF THE INVENTION

This invention relates to a method and an apparatus for heat sealing two thermoplastic parts together. More particularly, the invention relates to the heat sealing of thermoplastic lids to thermoplastic containers.

The use of plastic containers for packaging food and other items has become more prevalent as new advances in this field have allowed the production of better containers. Such containers are often formed without an integral lid but rather use an aluminum foil lid which may be relatively easily removed by the consumer. It is common to seal such lids onto the containers by heat sealing. An adhesive, which commonly is a thermoplastic material, is applied to the outer portion of the lid or to the edge or flange of the container or both, the lid is placed on the open end of the container and a heated clamp is lowered onto the lid to press it firmly down on the container and melt the adhesive to form a good heat seal. The use of the hot clamp has the disadvantage that it will not only heat the adhesive but will also heat the material which is within the container thereby releasing steam and increasing the pressure inside the container. It is desirable to eliminate this internal pressure, particularly when the lid has a peelable pull tab because the internal pressure may cause failure of the pull tab. The internal pressure also can cause the destruction of the integrity of the heat seal and the foil lid may budge and/or wrinkle when the hot clamp is applied thereto.

There is a great desire in the industry to use lids made of thermoplastic materials so that foil can be eliminated. The hot clamp method of heat sealing can be used for heat sealing a thermoplastic lid to a thermoplastic container but this method suffers from several disadvantages other than those discussed above. Since the heat is applied from only one side of the construction to be sealed, i.e. from the top of the lid, the heat must travel through the lid material before it can melt the thermoplastic material of the edge or flange of the container. This means that the heat transfer process takes longer than for foil lids, thereby slowing down the processing time, and may also cause undesirable distortion or melting of the lid itself. Additionally, the lid has to be perfectly balanced on the flange of the container in order to get a good seal because otherwise the contact with the hot clamp will be uneven, causing the heat seal to be inconsistent.

SUMMARY OF THE INVENTION

The invention relates to a method of heat sealing at least two thermoplastic parts which comprises clamping the parts together with a cooled clamp so that the edges of the parts are exposed and then melting the edges together by contacting them with a heating means. More specifically, the invention relates to a method of heat sealing a lid comprised at least in part of a thermoplastic to a thermoplastic container with a flange at the open end thereof. The method comprises clamping the lid and the container together with a cooled clamp so that the edge of the lid and the container flange are exposed and then melting the lid edge and the container flange together by contacting them with a heating means. A layer of a protective material is interposed between the seal head and the parts to be sealed to protect the seal head. The apparatus for accomplishing this method comprises a movable cooled clamp means suitable for clamping the lid and container together and a movable heating means suitable for contacting the lid and the container flange and melting them together.

DETAILED DESCRIPTION OF THE INVENTION

Figure 1:
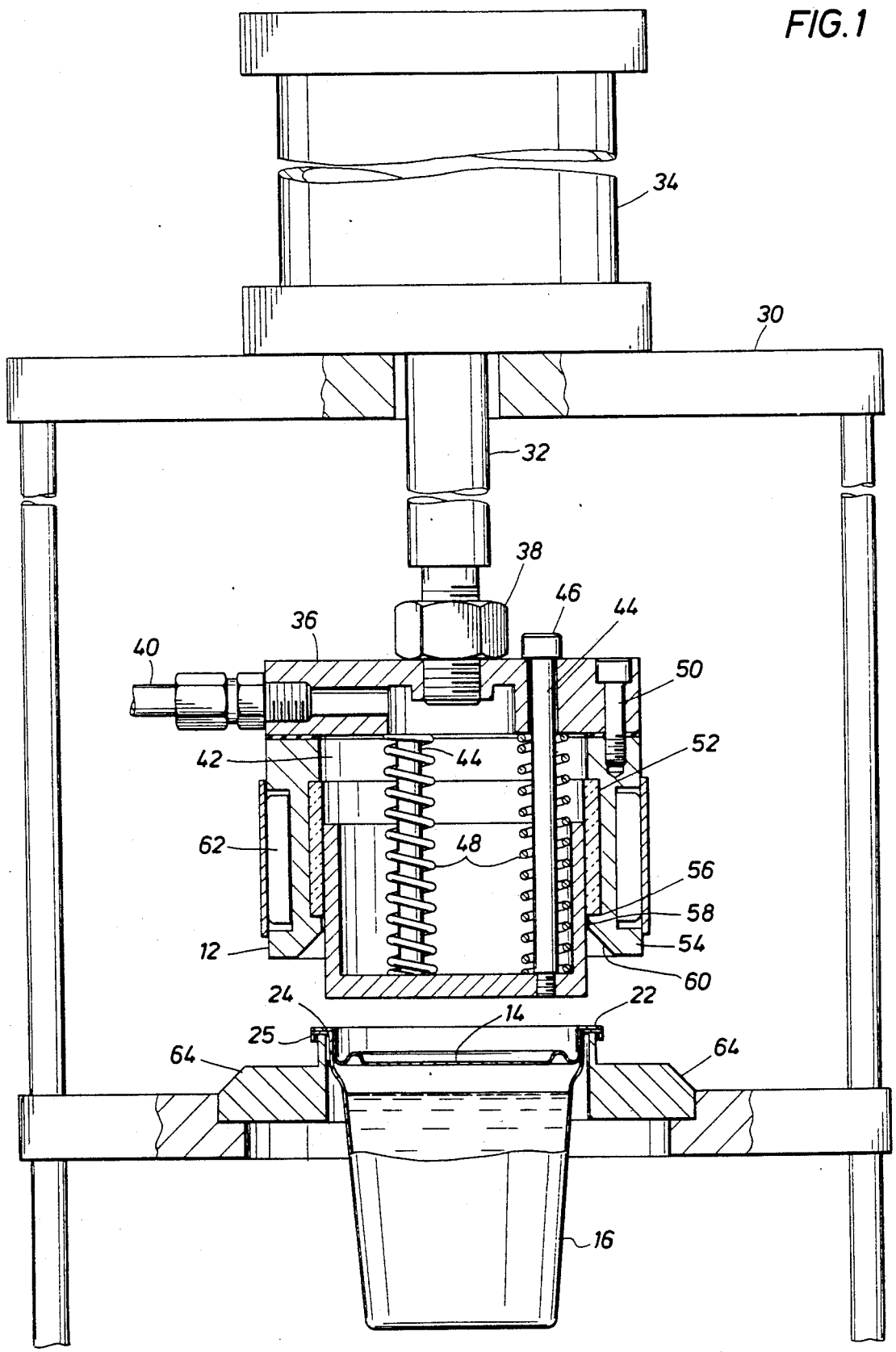
FIG. 1 is a cross-section illustrating the heat sealing device of this invention.

FIG. 1 illustrates the overall apparatus and specifically includes a cross-section of the heat sealing device shown as a frame 30 which supports the device. A movable rod 32 passes through an opening in the upper portion of the frame 30. Mounted on top of the frame 30 is means 34 for moving rod 32 vertically. The bottom end of rod 32 is threadably secured in the carrier plate 36 and held in place by nut 38.

On one side of the carrier plate 36, there is a supply port 40 to allow the passage of cool fluid, preferably air or water, to the interior cavity 42 of the heat sealing device. Cooled clamp 10 is suspended underneath carrier plate 36 by means of bolts 44 which extend through openings in the carrier plate 36 and are threadably mounted in the bottom of t he cooled clamped 10. The bolts 44 are free to slide vertically through the holes in the carrier plate 36 until the top portion 46 of the clamped bolts 44 come in contact with the top of the carrier plate 36. Springs 48 are positioned around bolts 44 between the bottom of the carrier plate 36 and the top of the cooled clamp 10.

Seal head 12 is mounted on and suspended from carrier plate 36 by means of bolts 50 and is positioned such that it surrounds the cooled clamp 10 but may move vertically with respect thereto. Seal head 12 has an inner insulating layer 52, made, for example, of TELON, (trademark for polytetrafluoroethylene) to reduce the amount of heat from the seal head 12 which is transmitted to the cooled clamp 10. Seal head 12 also has a heated portion 54 which is made of a material such as steel, preferably chrome-plated steel, which may be heated quickly and efficiently. It is important that the bottom of the heated portion 54 be shaped as shown in FIG. 1 for reasons which will be explained later. A horizontal seat 56 is formed to hold the insulating layer 52 in place. Vertically extending surface 58 extends a short way down from seat 56 and is spaced away from cooled clamp 10. Finally, beveled edge 60 extends outwardly from vertical extension 58.

A heating means 62 is provided around the outside of the seal head 12. Removable support ring 64 is positioned in the bottom section of frame 30 to support both the container 16 and the lid 14. Support ring 64 may be changed to accommodate different size containers.

In operation, the means 34 for moving the rod 32 will move the rod 32 and the carrier plate 36 downwardly. Eventually, this will cause the bottom portion of the cooled clamp 10 to come in contact with lid 14 which is resting upon the flange 24 of the container 16. The downward movement of the cooled clamp 10 will be stopped by the resistance of support ring 64. The downward pressure from the means 34 will continue to force the carrier plate 36 downward thereby compressing the springs 48 and continuing the downward movement of the seal head 12. The downward movement will be stopped when the seal head 12 comes into contact with the lid edge 22. The hot seal head 12 will stay in contact therewith long enough to melt the lid edge 22 together with the flange 24 of the container 16 to seal the lid 14 to the container 16.

Next, the means 34 will be reversed in order to move the carrier plate 36 upwardly and cause the seal head 12 to move away from the container 16. The cooled clamp 10 will stay in place until the carrier plate 36 moves upwardly far enough to come in contact with the top portions 46 of bolts 44. At that time, the cooled clamp 10 will move away from the container 16.

In order to increase the reliability of the seal formed between the lid 14 and the container 16, it is preferred that the retraction speed of the cooled clamp 10 be slowed down substantially. It is important to break the cooled clamp 10 away from the container 16 slowly because a vacuum is generated when the cooled clamp 10 is withdrawn too rapidly. This can cause the lid 14 to pull away from the container 16. Preferably, the speed of operation of the entire device is improved by incorporating a dual speed driving mechanism. Such a mechanism provides a slow withdrawal for the first portion of the retraction, perhaps 1/16th of an inch, and a rapid withdrawal thereafter.

In one embodiment of the present invention, the contact between the plastic lid 14 and the seal head 12 comes at the beveled edge 60. The width of the beveled edge 60 is such that it can be used for a variety of container and lid sizes. In another embodiment, the contact between the seal head 12 and the lid 14 comes at the vertically extending surface 58 of the seal head 12. The diameter of the flange 24 is chosen so that it is greater than the diameter of cooled clamp 10 and no more than slightly greater than the inside diameter of seal head 12 at surface 58. Further, the bottom of the insulating layer 52 can be used to further compress the lid 14 onto the container 16 to improve the integrity of the ultimate heat seal. This embodiment can be used for hermetic seals. It improves dramatically the ratio of perfect to imperfect seals and also will flatten the bead of melted plastic which will tend to form on top of the lid during the melting operation.

In order to maximize the percentage of acceptable heat seals which can be obtained according to the present invention, it is highly preferred that the method above be followed by a post seal compression step. As the outer portion of the bead of melted plastic which is formed from the lid edge 22 and the flange 24 cools, a second compression will form internal welds between edge 22 and flange 24 because the plastic inside is still molten when the second compression takes place.

Figure 2:
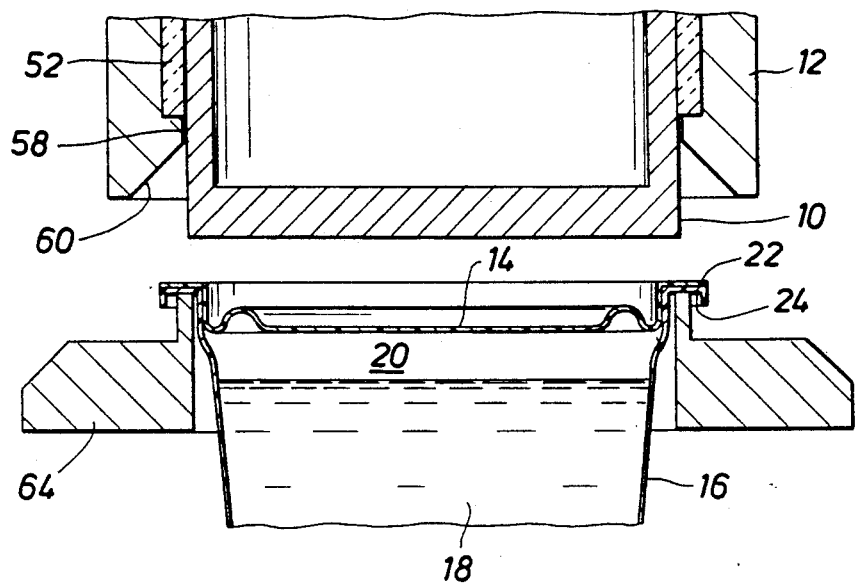
FIGS. 2, 3, 4 and 5 are schematics illustrating the operation of the heat sealing device of the present invention.

FIG. 2 illustrates the relative positions of the cooled clamp 10, seal head 12, lid 14 and container 16 filled with a liquid 18 and also having a gas filled head space 20. In FIG. 2, the elements are all in position before the sealing operation begins. The lid 14 is in place on top of the container 16 and the edge 22 of the lid 14 is on top of and in contact with the flange 24 of the container 16. Return lip 25 is positioned at the outside of flange 24. Lip 25 is an optional feature.

Figure 3:
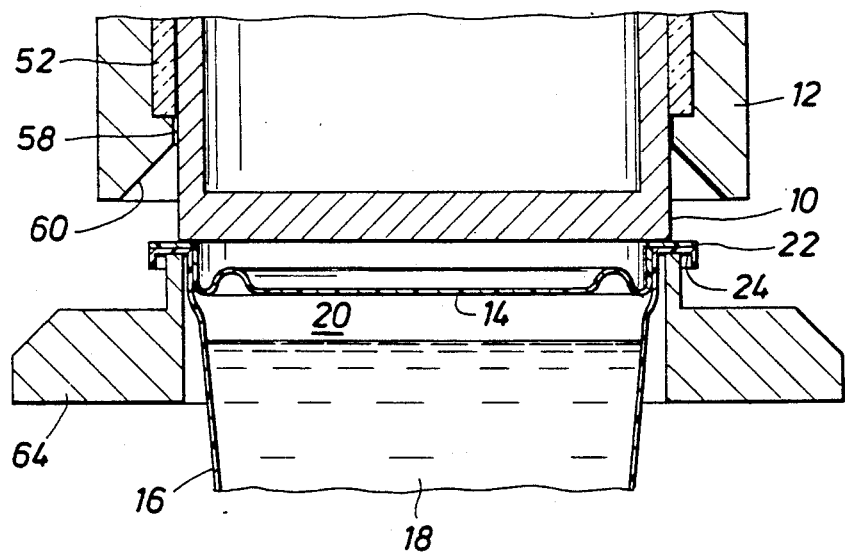

In FIG. 3, the cooled clamp 10 has been lowered so that it has come in contact with the lid edge 22 to force it down onto the flange 24 of the container 16 and hold it in that position. A portion of the lid edge 22 and lip 24 extends outwardly beyond the outer edge of the clamp 10. The headspace 20 in the container 16 is cooled and possibly partially condensed by the cooled clamp 10.

Figure 4:
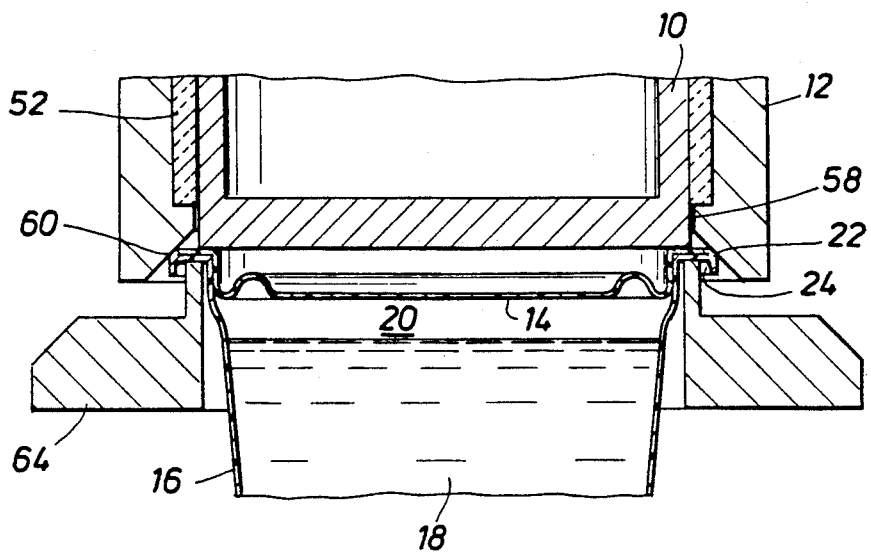
Figure 5:
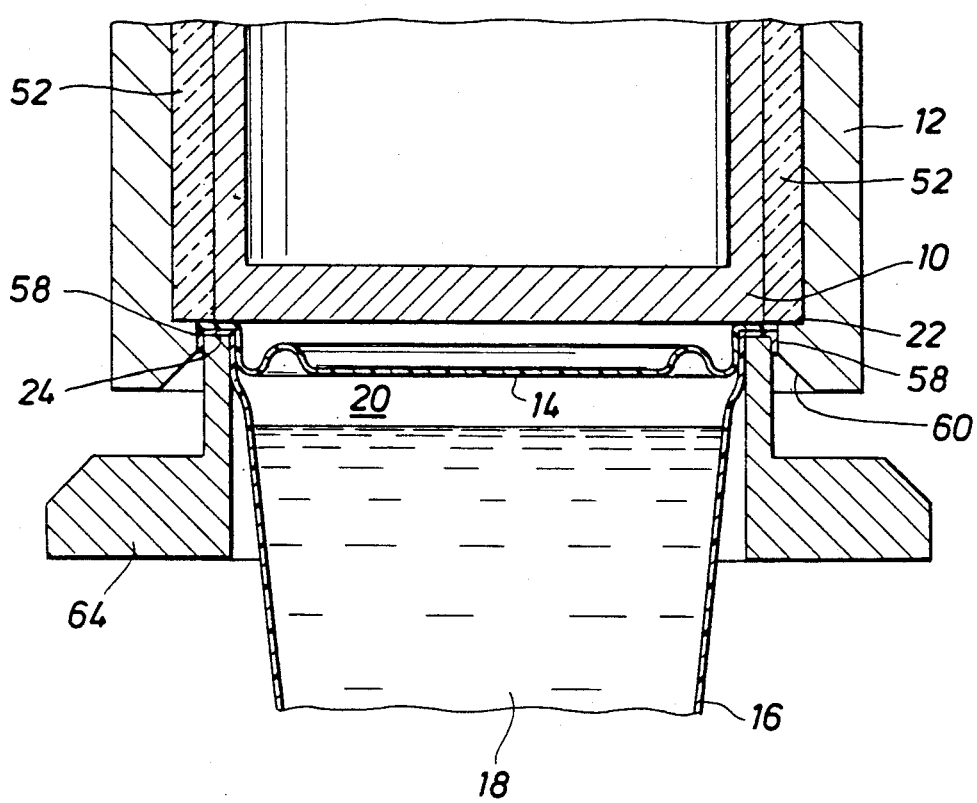

FIG. 4 illustrates the formation of the heat seal. The seal head 12 has been brought down until it comes in contact with the portion of the lid edge 22 and flange 24 which extend outwardly beyond the edge of the cooled clamp 10. The seal head 12 is heated sufficiently so that it melts the lid edge 22 and the flange 24 of the container so that they melt together and form a heat seal weld. This weld is strong enough to hold the lid 14 in place on container 16 and maintain the integrity of the liquid 18 stored within. FIG. 5 illustrates the formation of the heat seal when heating contact takes place at surface 58.

During the operation of the above apparatus, polymer can build up on the surface where the seal head 12 contacts the plastic parts which are to be sealed. Also, when sealing containers which are overfilled with liquid, the liquid can splash out onto a seal head. Both of these materials can degrade against the hot seal head and leave thick carbon deposits which may hinder heat transfer and cause more sticking. The net effect is reduced seal integrity and more leaky containers.

Figure 6:
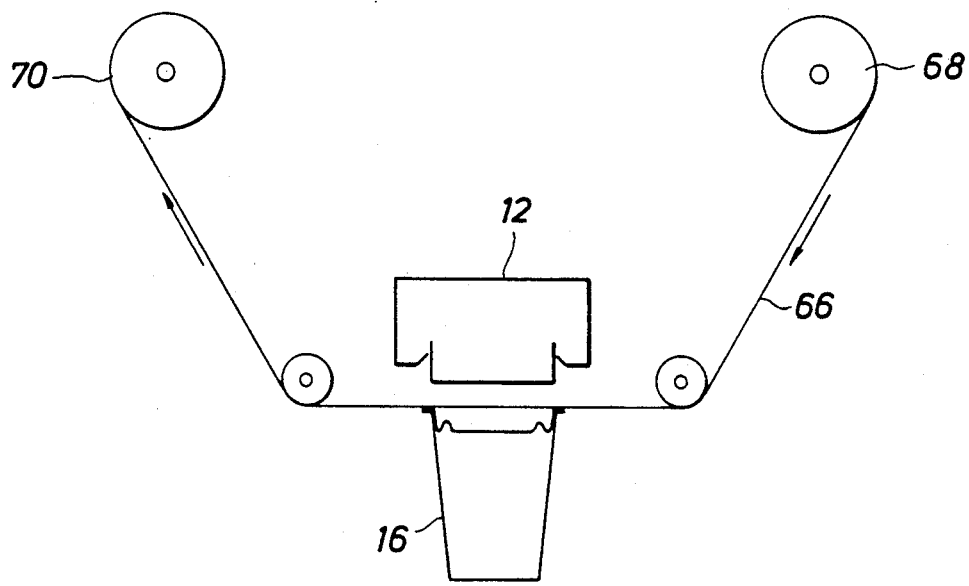
FIG. 6 illustrates the positioning of the protective material between the seal head and the parts to be sealed.

The solution to this problem is to insert a thin layer of a protective material between the seal head 12 and the plastic parts which are to be sealed. Materials which will withstand the hot temperature of the seal head and are non-sticking can be used. It is preferred that a figerglass cloth coated with Teflon ® resin be used, for example, 0.003 inches thick. In FIG. 6, a layer of protective material 66 moves from roller 68 in between the seal head 12 and the container 16 and onto the windup roll 70. Any polymer buildup or splashed liquid will adhere to the layer of protective material 66 and thus be removed from the container 16 and not be allowed to adhere to the seal head 12.

The cooled clamp 10 may be cooled by using air, water, or some other suitable means. The temperature of the clamp will be, for example, about 110° F. This will generally be sufficient to condense some of the gas in the head space because the liquid or other material which is stored within is generally very hot when it is put into the container for sterilization purposes.

The seal head is heated by, for example, an electric resistance heater. Depending upon the thermoplastic materials used in the lid in the container, the temperature of the seal head may be, for example, 500 to 600° F. It must be sufficiently hot to quickly melt both of the thermoplastic materials.

Almost any thermoplastic material can be used in either the lid or the container of the present invention. However, it is important that the thermoplastics used in the two parts he compatible. If the thermoplastics are not compatible, then they will not be properly melted together and the integrity of the heat seal weld will be suspect. If the lid itself is made entirely of a thermoplastic material, then that material may be, for example, polypropylene, polystyrene, polyethylene, etc. The material from which the container is formed is also a thermoplastic and may be, for example, polypropylene, polystyrene, polyethylene, etc. If the lid is primarily a foil lid with a layer or ring of thermoplastic adhesive, the thermoplastic must be one which is compatible with the adhesive, e.g. polypropylene, polystyrene, polyethylene, etc.

It is possible to create heat seal welds of different shapes. One shape is a rolled edge in which the weld is basically a bead at the end of the lid edge and container flange. It is created by using relatively thin flanges (lid edge and container flange) on both parts, for example, 0.15 inches for each. During the sealing operation, the seal head rolls down the flanges of both parts thereby providing a more smoothly contoured edge that is desired in some applications. The rolled edge also serves to provide a nice feel to the consumer and eliminate sharp edges. One further benefit of the rolled edge is that it in effect creates a "return lip" which normally has to be formed during the forming operation and has the advantage of stiffening the flange. The rolled edge technique can form a return lip with less material and thereby reduce the cost of the container.

The heat seal operation can also be carried out to form a beveled edge. This is created by using a relatively thick flange on the container, for example, 0.050 inches, and a relatively thin flange on the lid, for example, 0.015 inches. The beveled edge is created by using a seal head with a bevel. The beveled edge creates a nice feel to the consumer when drinking from the container and it also serves to eliminate any sharp edges that may have been left on the lid during the trim operation in forming.

The most outstanding advantage of the present invention is that relatively thick sheets of thermoplastic can be heat sealed in a short time. As discussed above, the hot clamp method requires that the heat from the clamp pass all the way through the lid material before it can melt the material of the flange of the container. This can cause undesirable melting of the rest of the lid material and can also take quite a bit of time, possibly up to six seconds for normal materials and up to three seconds if an expensive heat resistant outer layer, such as polyester, is added. Using the apparatus and method of the present invention, lids containing thermoplastic materials can be heat sealed to thermoplastic containers in less than one second, which, at the present time, is a requirement for successful commercial production.

The present invention is especially useful in the food filling industry because existing food filling equipment can readily be adapted to utilize the present invention. The elements of this invention can replace the existing hot clamp and existing seal heads and the currently used temperature controls can be used to operate the modified apparatus.

Another benefit is that the cooled clamp cools the head space of a container which is filled with hot product. Such products may release steam which create pressure inside the container and adversely affect the seal integrity and the overall performance of the container. The clamp action temporarily seals the container so that steam within the container cannot reach the seal area and disturb the sealing process. Finally, when the cooled clamp is maintained in position on the parts after sealing, it allows the seal area to cool thereby increasing the percentage of good containers sealed on the filling machine.

Since the lid and the container flange are to be melted together, the present process can tolerate a lack of balance of the lid on the container much better than the current heat sealing processes discussed above. Finally, as discussed above, the final shape of the seal itself can be altered for different applications.

I claim:

1. An apparatus for heat sealing a lid comprised in part of a thermoplastic material to a thermoplastic container with a flange at the open end thereof, which comprises:
   a) a movable carrier means;
   b) means for moving said carrier means;
   c) a cooled clamp means movable in a direction perpendicular to the surface of the lid and mounted on the carrier means and suitable for clamping the lid and container together such that the edges of the lid and flange are exposed;
   d) a heating means movable in a direction perpendicular to the surface of the lid and mounted on the carrier means and suitable for contacting the edges of the lid and the container flange and melting them together, wherein said heating means is a hollow cylinder which surrounds the clamp means and is movable with respect thereto and wherein the heating means is comprised of a heated portion and an insulating layer which is disposed between the heated portion and the cooled clamp means and wherein the heated portion of the heating means has a vertically extending surface which is spaced from the clamp means and extends beyond the insulating layer such that the vertically extending surface is capable of contacting the lid edge and container flange and melting them together while the bottom of the insulating layer contacts the lid and compresses it onto the container;
   e) a protective material interposed between the heating means and the lid, said protective material being movable in a direction parallel to the surface of the lid; and
   f) means for moving the protective material from a side of the heating means between the heating means and the lid to the opposite side of the heating means.

2. The apparatus of claim 1 wherein the bottom of the heating means has a downwardly and outwardly extending beveled edge for contacting the lid and container flange and melting them together.

3. An apparatus for heat sealing a lid comprised at least in part of a thermoplastic material to a thermoplastic container with a flange at the open end thereof, which comprises:
   a) a cooled clamp means movable in a direction perpendicular to the surface of the lid and suitable for clamping the lid and the container together such that the edges of the lid and the flange are exposed;
   b) a heating means movable in a direction perpendicular to the surface of the lid and suitable for contacting the edges of the lid and the container flange and melting them together, wherein said heating means is a hollow cylinder which surrounds the clamp means and is movable with respect thereto and wherein the heating means is comprised of a heated portion and an insulating layer which is disposed between the heated portion and the cooled clamp means and wherein the heated portion of the heating means has a vertically extending surface which is spaced from the clamp means and extends beyond the insulating layer such that the vertically extending surface is capable of contacting the lid edge and container flange and melting them together while the bottom of the insulating layer contacts the lid and compresses it onto the container;

c) a protective material interposed between the heating means the lid, said protective material being movable in a direction parallel to the surface of the lid; and d) means for moving the protective material from a side of the heating means between the heating means and the lid to the opposite side of the heating means.

* * * * *